(12) United States Patent
McCaffrey et al.

(10) Patent No.: US 10,358,929 B2
(45) Date of Patent: Jul. 23, 2019

(54) COMPOSITE AIRFOIL

(71) Applicant: United Technologies Corporation, Hartford, CT (US)

(72) Inventors: Michael G. McCaffrey, Windsor, CT (US); Greg C. Ojard, Vernon, CT (US); Kevin L. Rugg, Fairfield, CT (US)

(73) Assignee: United Technologies Corporation, Farmington, CT (US)

( * ) Notice: Subject to any disclaimer, the term of this patent is extended or adjusted under 35 U.S.C. 154(b) by 649 days.

(21) Appl. No.: 14/905,345

(22) PCT Filed: Jul. 1, 2014

(86) PCT No.: PCT/US2014/045134
§ 371 (c)(1),
(2) Date: Jan. 15, 2016

(87) PCT Pub. No.: WO2015/047511
PCT Pub. Date: Apr. 2, 2015

(65) Prior Publication Data
US 2016/0160658 A1    Jun. 9, 2016

Related U.S. Application Data

(60) Provisional application No. 61/846,239, filed on Jul. 15, 2013.

(51) Int. Cl.
*F01D 5/28*    (2006.01)
*F01D 5/14*    (2006.01)
(Continued)

(52) U.S. Cl.
CPC .............. *F01D 5/282* (2013.01); *F01D 5/147* (2013.01); *F01D 9/041* (2013.01); *F04D 29/388* (2013.01);
(Continued)

(58) Field of Classification Search
CPC .......... F01D 5/282; F01D 5/147; F01D 9/041; F04D 29/388; F05D 2220/32;
(Continued)

(56) References Cited

U.S. PATENT DOCUMENTS

| | | | |
|---|---|---|---|
| 4,111,606 A | 9/1978 | Prewo | |
| 4,722,817 A | 2/1988 | Nakano et al. | |

(Continued)

FOREIGN PATENT DOCUMENTS

| | | |
|---|---|---|
| EP | 1555391 A2 | 7/2005 |
| EP | 2458153 A2 | 5/2012 |

OTHER PUBLICATIONS

International Search Report and Written Opinion from PCT Application Serial No. PCT/US2014/045134, dated Apr. 17, 2015, 12 pages.
Extended European Search Report for EP Application No. 14847148.5, dated Feb. 9, 2017, 7 Pages.

*Primary Examiner* — Aaron R Eastman
(74) *Attorney, Agent, or Firm* — Kinney & Lange, P.A.

(57) ABSTRACT

An airfoil includes a core with a first Young's Modulus; and an outer section at least partially surrounding the core with a second Young's Modulus, wherein the first Young's Modulus is higher than the second Young's Modulus.

13 Claims, 3 Drawing Sheets

(51) Int. Cl.
*F01D 9/04* (2006.01)
*F04D 29/38* (2006.01)

(52) U.S. Cl.
CPC ...... *F05D 2220/32* (2013.01); *F05D 2230/20* (2013.01); *F05D 2230/60* (2013.01); *F05D 2300/501* (2013.01); *F05D 2300/6012* (2013.01); *F05D 2300/6033* (2013.01); *F05D 2300/6034* (2013.01); *F05D 2300/614* (2013.01); *Y02T 50/672* (2013.01); *Y02T 50/673* (2013.01)

(58) Field of Classification Search
CPC ............ F05D 2230/20; F05D 2230/60; F05D 2300/501; F05D 2300/6012; F05D 2300/6033; F05D 2300/6034; F05D 2300/614
USPC ..................................... 416/229 A
See application file for complete search history.

(56) References Cited

U.S. PATENT DOCUMENTS

| | | | |
|---|---|---|---|
| 4,966,527 A * | 10/1990 | Merz | B29C 70/202 |
| | | | 416/230 |
| 5,110,652 A | 5/1992 | Allaire et al. | |
| 5,151,390 A | 9/1992 | Aoki et al. | |
| 5,382,453 A | 1/1995 | Mason | |
| 6,709,230 B2 | 3/2004 | Morrison et al. | |
| 7,223,465 B2 | 5/2007 | Subramanian et al. | |
| 7,754,126 B2 | 7/2010 | Subramanian et al. | |
| 2005/0158171 A1* | 7/2005 | Carper | B32B 18/00 |
| | | | 415/200 |
| 2005/0186069 A1 | 8/2005 | Subramanian et al. | |
| 2007/0036658 A1 | 2/2007 | Morris | |
| 2011/0176927 A1 | 7/2011 | Alexander et al. | |
| 2011/0182743 A1 | 7/2011 | Naik | |
| 2011/0194941 A1* | 8/2011 | Parkin | B29C 70/48 |
| | | | 416/224 |
| 2012/0134839 A1* | 5/2012 | Parkin | F01D 5/147 |
| | | | 416/230 |

\* cited by examiner

COMPOSITE AIRFOIL

BACKGROUND

This invention is related to airfoils, and more particularly to composite airfoils.

Gas turbine engines comprise one or more rotating turbines that are used to extract energy from a high velocity and high temperature gas flow produced within the gas turbine engine. The turbines are comprised of a plurality of radially extending airfoil blades that are connected at their inner diameter ends to a rotor, which is connected to a shaft that rotates within the engine as the blades interact with the gas flow. The rotor typically comprises a disk having a plurality of axial retention slots that receive mating root portions of the blades to prevent radial dislodgment. Blades typically also include integral inner diameter platforms that prevent the high temperature gases from escaping through the radial retention slots. Between stages of the turbine blades are disposed a plurality of radially extending stationary airfoil vanes, which are typically supported by inner and outer diameter shrouds that are suspended from an outer engine case and supported by an inner structure, respectively. During operation of the engine, the turbine blades and vanes are subjected to high heat from combustion products. Additionally, the blades are subjected to large centrifugal loads due to spinning and large gas loads causing twisting and bending of the airfoil. As a result, the outermost surface of the airfoil is the most highly stressed. It is, therefore, a constant design challenge to develop materials for turbine blades and vanes that are more heat resistant to reduce cooling demands, lighter to increase propulsive efficiencies in aircraft engines and stronger to increase stress resistance and capability of the blade.

Typically, turbine blades and vanes are fabricated from high strength alloys as single pieces, with integral roots, platforms and shrouds. More recent blade designs have attempted to incorporate ceramic matrix composite (CMC) materials or organic matrix composite (OMC) materials, which are lightweight, heat resistant and strong. CMC material comprises a ceramic fabric that is infused with a pre-ceramic matrix. The ceramic fabric is preformed to a desired shape and the pre-ceramic matrix is converted into a ceramic matrix to produce a part having the lightweight and heat resistance characteristics of the matrix and the strength characteristics of the fabric. OMC material comprises a woven fabric or unidirectional collection of fibers infused with a resin. The fibers may be carbon, glass, aramide or a combination of fiber types. The fabric is preformed to a desired shape, and the resin is cured to form a rigid, lightweight component.

It is desirable to use CMC or OMC material, as the materials can weigh approximately one third of the weight of typical metal alloys used for components, while providing strength and having much higher temperature limitations. However, CMC and OMC blades are difficult to design due to high tensile stress in the leading edge and trailing edge regions. This high stress is a result of the combined radial pull load and gas load bending on the blade during engine operation. The trailing edge is particularly critical due to its requirement to be very thin.

SUMMARY

An airfoil includes a core with a first Young's Modulus; and an outer section at least partially surrounding the core with a second Young's Modulus, wherein the first Young's Modulus is higher than the second Young's Modulus.

A method of forming a composite airfoil includes forming a core with a first Young's Modulus; forming an outer section with a second Young's Modulus; and joining the core with the outer section so that the core is surrounded by the outer section. The first Young's Modulus is higher than the second Young's Modulus.

DETAILED DESCRIPTION

Figure 1:
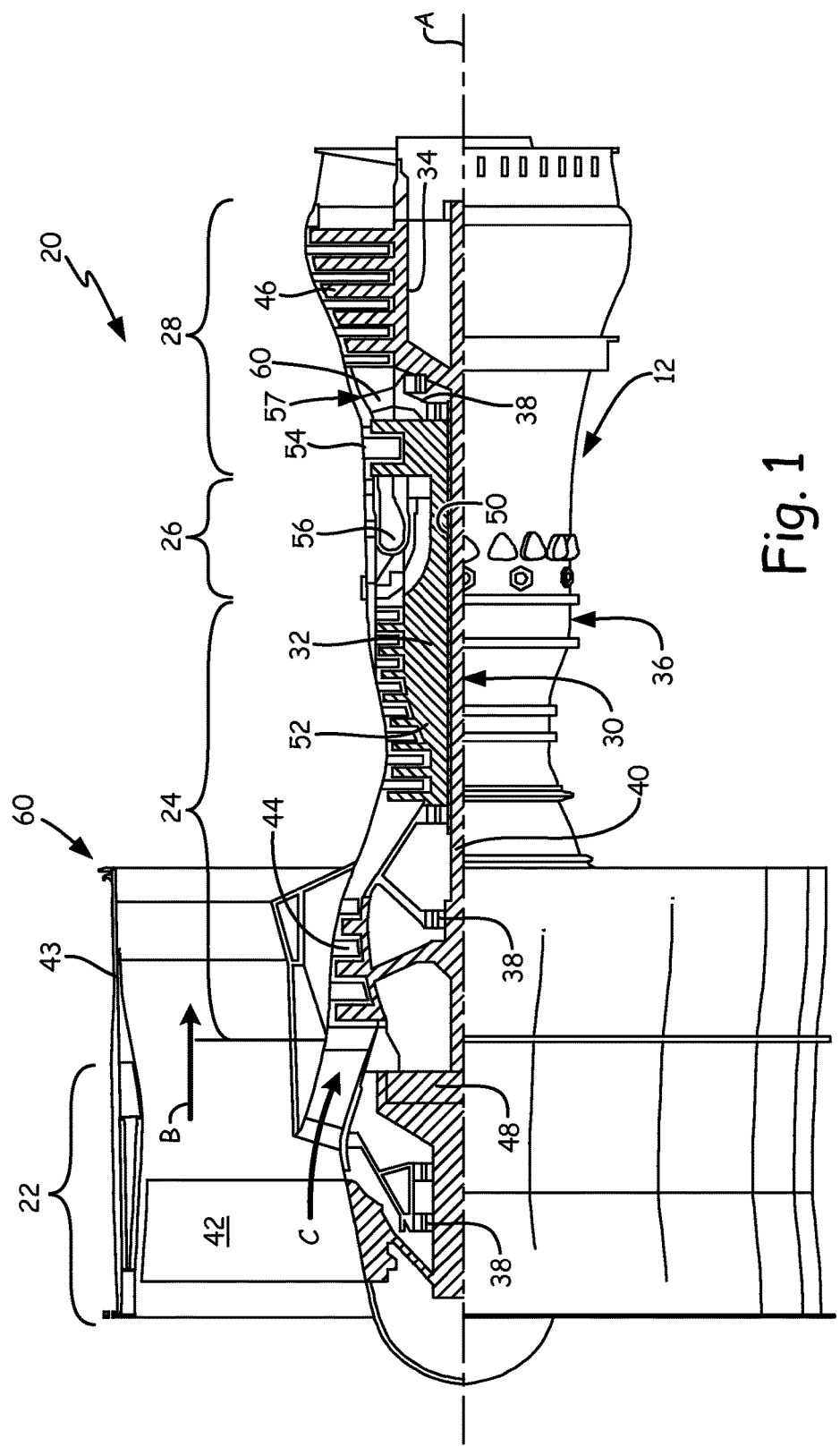
FIG. 1 is a quarter sectional view that schematically illustrates an example gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. It should be further understood that the disclosed non-limiting embodiment provides generally a ballistic barrier that is suitable for many types of rotating or rotary machines as known to those of ordinary skill in the art.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 41 and low pressure (or first) compressor section 44 to low pressure (or first) turbine section 46. Inner shaft 40 drives fan 41 through a speed change device, such as geared architecture 48, to drive fan 41 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 and then by high pressure compressor 52, mixed with fuel and ignited in combustor 56 to produce high speed exhaust gases, and then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7°\ R]^{0.5}$. The "Low corrected fan tip speed", as disclosed herein according to one non-limiting embodiment, is less than about 1150 ft/second.

The example gas turbine engine includes fan 41 that comprises in one non-limiting embodiment less than about twenty-six fan blades 42 and fan case 43 surrounding fan 41. In another non-limiting embodiment, fan section 22 includes less than about twenty fan blades 42. Moreover, in one disclosed embodiment low pressure turbine 46 includes no more than about six turbine rotors schematically indicated at 34.

In another non-limiting example embodiment low pressure turbine 46 includes about three turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

In a turbofan engine, lighter components generally lead to more efficient performance. If less energy is expended moving internal engine parts, more energy is available for useful work. At the same time, the components themselves must be strong enough to withstand forces typical for the operating environment and performance envelope. Safety considerations based on the frequency and/or severity of possible failure will often dictate that the engine components also be able to withstand certain atypical, yet foreseeable events as well. Because stronger components are often heavier and/or more expensive, a balance must be struck between efficiency, safety, and cost.

Few locations in an aircraft are more representative of efforts to optimize the balance between efficiency, safety, and cost than engine 20. While lighter materials are preferable to improve efficiency, the high risk of severe consequences from engine damage will require that engine 20 be made of components having additional margins of safety. Fiber composites typically have low weight, and three-dimensional weaving of the composites can greatly increase strength in the thickness direction.

Figure 2A:
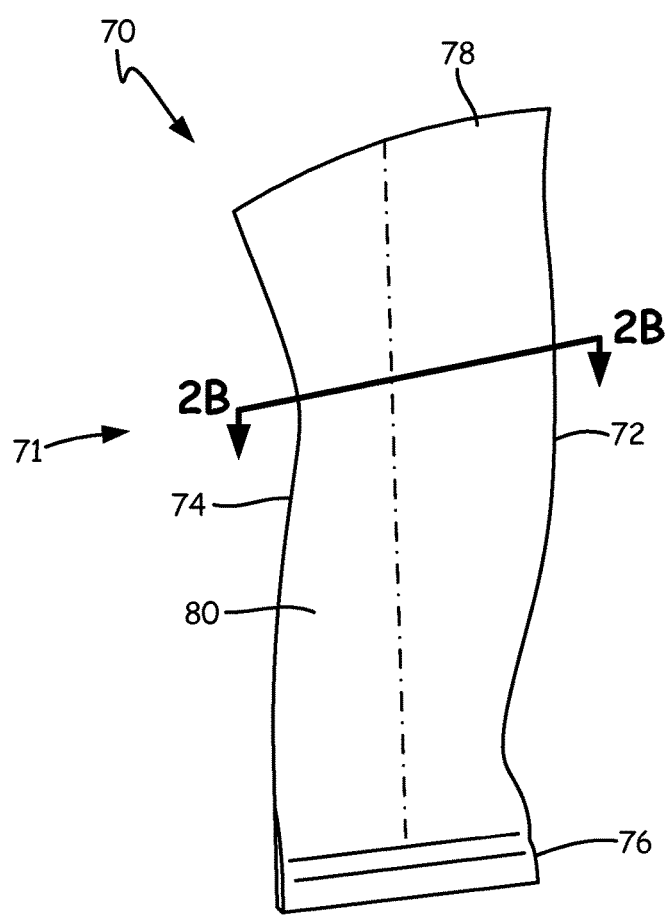
FIG. 2A is a perspective view of an embodiment of a composite fan blade for the gas turbine engine.
Figure 2B:
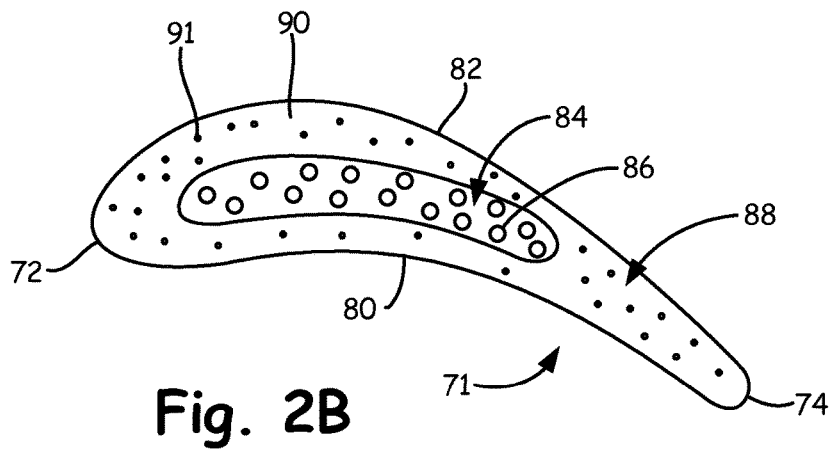
FIG. 2B is a cross-sectional view of the fan blade of FIG. 2A, taken along line 2B-2B.
Figure 2C:
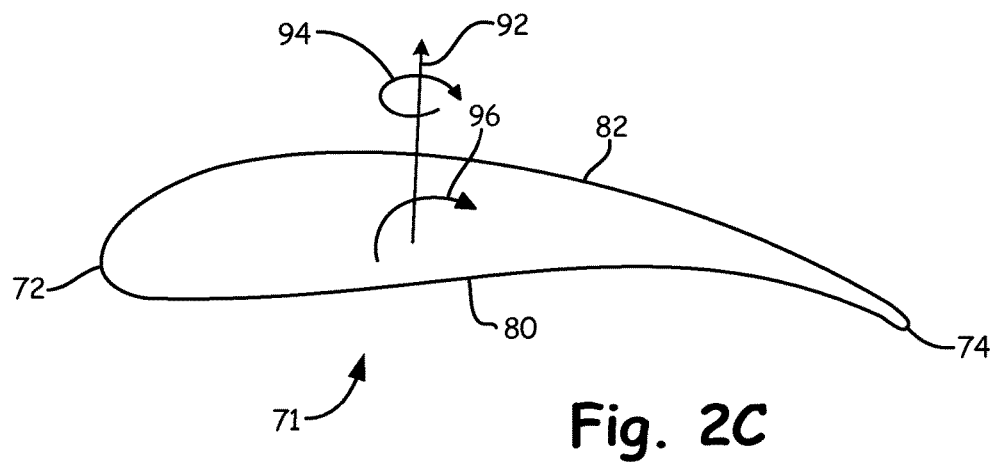
FIG. 2C shows a simplified cross-sectional view of the fan blade of FIG. 2A, and showing loads on the blade during engine operation

FIG. 2A is a perspective view of a composite fan blade 70 for the engine 20, FIG. 2B shows a cross-sectional view of blade 70, and FIG. 2C shows a simplified cross-sectional view of blade 70 showing loads on blade 70 during engine operation.

Composite blade 70 includes composite airfoil 71 having leading edge 72, trailing edge 74, root 76, tip 78, pressure side 80, suction side 82, core 84 with first fibers 86, and outer section 88. Outer section 88 includes a plurality of plies 90 with second fibers 91. Root 76 is illustrated as a dovetail root. However, root 76 can have any configuration. Composite airfoil 71 extends from root 76 to tip 78. A span of composite airfoil 71 is generally defined along its longitudinal axis from root 76 to tip 78. FIG. 2C shows radial load 92, torsional load 94 and bending moment 96.

Core 84 is located at a center of interior portion of composite airfoil 71 between leading edge 72 and trailing edge 74, and between pressure side 80 and suction side 82. Core 84 is surrounded by outer section 88, which forms leading edge 72, trailing edge 74, pressure side 80 and suction side 82. In the embodiment shown, core 84 is a molded core with fibers 86. In other embodiments, core 84 could be a three-dimensional woven core, a plurality of two dimension plies, or another type of composite core. In the embodiment shown, outer section 88 is a plurality of two-dimensional plies 90 with fibers 92, but in other embodiments, outer section 88 could be another type of composite depending on blade requirements. Blade 70 can be made of CMC material, OMC material or other composite materials.

Airfoil plies 90 are located on either side of core 84 to form outer section 88. Airfoil plies 90 are two-dimensional fabric skins. Elongated fibers extend through airfoil plies 90 at specified orientations and give airfoil plies 90 strength. Airfoil plies 90 can vary in shape, size and fiber orientation. Airfoil plies 90 can be a dry fabric that is combined with a resin in a suitable mold and cured to form composite airfoil 71. Alternatively, airfoil plies 71 can be preimpregnated uncured composites, (i.e. "prepregs") in which fibers and a resin are combined with a suitable curing process.

Composite airfoil 70 can be formed by stacking airfoil plies 90 on core 84 which has been molded. Airfoil plies 90 are stacked in a mold on either side of woven core 84 according to a ply lay-up. Typically the ply lay-up on the pressure side 80 of core 84 is a minor image of the ply lay-up on the suction side 82 of core 84, but this is not always the case. Once all airfoil plies 90 are properly stacked, the mold is closed, resin is added and the resin is cured to produce composite airfoil 71. After curing, material can be removed from composite airfoil 71 to further shape root 76, tip 78 and leading edge 72. In an alternative example, airfoil plies 90 contain resin so that resin is not directly added to airfoil plies 90 after stacking them in the mold.

Outer section 88 and core 84 can be formed from the same material or from different materials. For example, airfoil plies 90 of outer section 88 can be formed from a woven fabric or a uniweave material, and core 84 can be formed from a uniweave material. In a woven fabric, half of the fibers are orientated in a first direction and the other half of the fibers are oriented 90° to the first direction. For example, half of the fibers of a 0/90° woven fabric are oriented along the longitudinal axis and the other half of the fibers are oriented along the chordwise axis, perpendicular to the longitudinal axis. Similarly, half of the fibers of a +/−45° woven fabric are oriented at +45° from the longitudinal axis and the other half of the fibers are oriented at −45° from the longitudinal axis. The woven fabric can be a silicon carbide woven fabric, containing silicon carbide fibers to which ceramic matrix is infused to form a composite. Alternatively, the woven fabric can be a prepreg. In a prepreg material, the fibers and pre-ceramic resin are combined, and upon heating, the resin is converted to a ceramic matrix. Further, the woven fabric can be a hybrid which contains two different types of fibers of differing strength and Young's Modulus.

In contrast to woven materials, a uniweave material has about 98% of its fibers oriented along the longitudinal axis of airfoil 71. A small number of fibers extend perpendicular to the longitudinal axis and stitch the uniweave material together.

Fabric or uniweave material can be formed with different ceramic fibers, which have different YM. Typical ceramic fibers include HiNicalon™, with a Young's Modulus of about 270 giga-Pascals ("GPa"), HiNicalon™ with a Young's Modulus of about 420 GPa and SCS-6™ with a Young's Modulus of about 380 GPa.

The fiber orientation affects the strength and Young's Modulus of the material. For example, a composite formed of a 0/90° HiNicalon™ woven fabric has a Young's Modulus of approximately 191 GPa in both the 0° and 90° directions, where 0° represents the represents the longitudinal axis (span direction) of airfoil 34. In comparison, a composite formed of a 0° uniweave material comprising the same fibers has a Modulus of approximately 183 GPa in the 0° direction and approximately 87 GPa in the 90° direction.

Core 84 is formed of a material with a higher Young's Modulus than the Young's Modulus of outer section 88. Having a material with a higher Young's Modulus at core 84 than on the outer portion 88 of blade 70 allows for more radial load to be carried in core 84, as core 84 with a higher Young's Modulus is stiffer. This results in a lowering of the radial stress in leading edge 72 and trailing edge 74, resulting in blade 70 leading edge 72 and trailing edge 74 having reduced total stress. As leading edge 72 and trailing edge 74 are generally the thinnest and weakest parts of blade 70, they are the parts which limit the overall capability of blade 70. Reducing the stress in leading edge 72 and trailing edge 74 can result in an increase of overall capability of blade 70.

During engine operation, as seen in FIG. 3C, the load of blade 70 consists of radial load 92 and bending load 94. By using a material with a high Young's Modulus in core 84, the core can carry a higher radial load 92, reducing the stress in the leading edge 72 and trailing edge 74, increasing the overall load capacity of blade 70. Additionally, as the core 84 does not experience much bending stress due to the thickness of blade 70 in the core, core 84 can carry an even higher radial load.

Core 84 can have a higher Young's Modulus than outer section 88 in a variety of different ways. Core 84 can be made of a composite material with first fibers 86 with a high Young's Modulus, for example HiNicalon™/SCS-6™, and outer section 88 can be made of a plurality of plies 90 formed with of HiNicalon™ fibers. A second example, as discussed above, could include core 84 being made of a uniweave material, for example, with first fibers 86 oriented radially, with outer section 88 made of woven fabric plies 90.

By forming blade 70 with core 84 having a higher Young's Modulus than outer section 88, core 84 is able to carry more radial loads. This results in blade 70 being able to withstand higher aerodynamic loads and loads generated by bird strikes or other impacts, allowing blade 70 to operate at a higher RPM than blades which do not have core 84 with a higher Young's Modulus than outer section 88.

Figure 3:
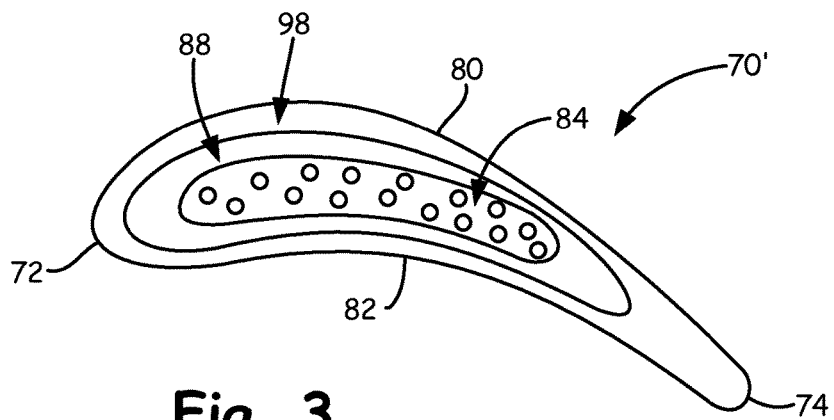
FIG. 3 is a cross-sectional view of another embodiment of a blade, showing a core with first and second outer sections.

FIG. 3 is a cross-sectional view of another embodiment of blade 70' with core 84, first outer section 88 and second outer section 98. Blade 70 includes airfoil 71, leading edge 72, trailing edge 74, root 76, tip 78, pressure side 80, suction side 82, core 84, first outer section 88 and second outer section 98.

Core 84 of blade 70' in the illustrated embodiment has a Young's Modulus that is higher than the Young's Modulus of first outer section 88 and second outer section 98. The Young's Modulus of first outer section 88 is higher than the Young's Modulus of second outer section 98.

As discussed in relation to FIGS. 2A-2C, the Young's Modulus of core 84, first outer section 88 and second outer section 98 of blade 70' can be controlled base on the type of materials used to form each section, the formation of each section (type of weave, fiber orientation, etc.) or both. For example, core 84 could be made of a plurality of plies formed with SCS-6™ fibers. First outer section 88 could be formed of a plurality of uniweave plies of HiNicalon-S™, and second outer section 98 could be formed of a plurality of woven fabric plies made of HiNicalon-S™. Other embodiments could use different materials and/or combinations to form blade 70' with core 84 with a higher Young's Modulus than outer sections. Additionally, other embodiments could include additional layers of outer sections, with the Young's Modulus of each section decreasing from core 84 to blade 70' pressure and suction sides 80, 82.

As in blade 70 of FIGS. 2A-2C, core 84 with a high Young's Modulus allows core 84 to carry more of the radial load on airfoil 71 during operation. Additionally, first outer section 88 of blade 70' can carry more radial load, transferring it from the weakest regions of blade 70', the leading edge 72 and trailing edge 74 formed by second outer section 98 with the lowest Young's Modulus. This can increase overall capabilities of blade 70' as well as protect core 84 from environmental degradation, protecting the fibers forming core 84 and therefore the strength of core 84. Additionally, the use of different materials in core 84 and outer sections 88, 98 can allow a design to tailor the stiffness of airfoil 71 to control frequency response. This can allow for tuning out of resonant frequencies that may be problematic in a particular engine, and could possibly result in undesired airfoil cracking.

While FIGS. 2A-3 show example blades with a core and an outer section, other types of blades could be formed. For example, a blade could have a hollow inner section, and core section 84 with a high Young's Modulus could surround that hollow interior, with outer section 88 surrounding core 84. Moreover, the present invention can be applied to vanes and other types of structures. Additionally, the examples shown in FIGS. 2A-3 could vary in a variety of ways, for example, in types of core, ratio of core to one or more outer sections, dimensions, materials used, etc. Additionally, the core does not have to be in the center of the blade.

Discussion of Possible Embodiments

The following are non-exclusive descriptions of possible embodiments of the present invention.

An airfoil can include a core with a first Young's Modulus; and an outer section surrounding the core with a second Young's Modulus, wherein the first Young's Modulus is higher than the second Young's Modulus.

The airfoil of the preceding paragraph can optionally include, additionally and/or alternatively, any one or more of the following features, configurations and/or additional components:

the core comprising first fibers;

the first fibers being unidirectional;

the outer section comprising a plurality of two-dimensional plies comprising second fibers;

the Young's Modulus of the first fibers being higher than a Young's Modulus of the second fibers;

an additional section comprising third fibers, wherein a Young's Modulus of the additional fibers is lower than the Young's Modulus of the second fibers;

the core being a three-dimensional woven core;

the core being a plurality of two-dimensional woven fabric plies;

the core being a molded core;

the core being a uniweave;

the core extending in a spanwise direction;

the outer section forming a leading edge, a trailing edge, a suction side and a pressure side of the airfoil;

the airfoil being a ceramic matric composite or an organic matrix composite; and/or the airfoil forming a blade or a vane.

A method of forming a composite airfoil can include forming a core with a first Young's Modulus; forming an outer section with a second Young's Modulus; and joining the core with the outer section so that the core is at least partially surrounded by the outer section, wherein the first Young's Modulus is higher than the second Young's Modulus.

The method of the preceding paragraph can optionally include, additionally and/or alternatively, any one or more of the following steps, features, configurations and/or additional components:

the step of forming the core comprising forming the core through one of: a plurality of two-dimensional plies formed with first fibers, a mold of a plurality of first fibers and a three-dimensional weave of first fibers;

the first fibers in the plurality of first plies being substantially unidirectional;

the step of forming the outer section comprising forming a plurality of plies with second fibers;

a Young's Modulus of the first fibers being higher than a Young's Modulus of the second fibers; and/or the outer section forming a pressure side, suction side, leading edge and trailing edge of the airfoil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
   a first ceramic matrix composite core with a first Young's Modulus; and
   an outer section comprising a second ceramic matrix composite, at least partially surrounding the core with a second Young's Modulus, wherein the first Young's Modulus is higher than the second Young's Modulus;
   wherein the first ceramic matrix composite core comprises first fibers configured to preferentially reinforce a span of the airfoil along a longitudinal axis between a root and a tip;
   wherein the outer section comprises a plurality of two-dimensional plies comprising second fibers; and
   wherein a Young's Modulus of the first fibers is higher than a Young's Modulus of the second fibers along the span of the airfoil.

2. The airfoil of claim 1, further comprising an additional section between the core and the outer section, the additional section comprising third fibers, wherein a Young's Modulus of the additional fibers is lower than the Young's Modulus of the first fibers along the span and higher than the Young's modulus of the second fibers along the span.

3. The airfoil of claim 1, wherein the first fibers in the core include a three-dimensional woven core, a unidirectional weave, a plurality of two-dimensional woven fabric plies, or a combination thereof.

4. The airfoil of claim 1, wherein the core is molded.

5. The airfoil of claim 1, wherein an outer surface of the outer section defines a leading edge, a trailing edge, a suction side and a pressure side of the airfoil.

6. The airfoil of claim 1, wherein the airfoil is turbine blade or vane configured for installation in a hot section of the gas turbine engine downstream of a combustor.

7. A method of forming a composite airfoil, the method comprising:

forming a core comprising a first ceramic matrix composite with a first Young's Modulus along a span of the airfoil along a longitudinal axis between a root and a tip;

forming an outer section comprising a second ceramic matrix composite, with a second Young's Modulus along the span of the airfoil; and joining the core with the outer section so that the core is surrounded by the outer section, wherein the first Young's Modulus is higher than the second Young's Modulus.

wherein the ceramic matrix composite core comprises first fibers configured to preferentially reinforce the span of the airfoil;

wherein the outer section comprises a plurality of two-dimensional plies comprising second fibers; and wherein a Young's Modulus of the first fibers is higher than a Young's Modulus of the second fibers along the span of the airfoil.

8. The method of claim 7, wherein the step of forming the core comprises:

forming the core through one of: a plurality of two-dimensional plies formed with first fibers, a mold of a plurality of first fibers and a three-dimensional weave of first fibers.

9. The method of claim 8, wherein the first fibers in the plurality of first plies are substantially unidirectional.

10. The method of claim 8, wherein the step of forming the outer section comprises:

forming a plurality of plies with second fibers.

11. The method of claim 10, wherein a Young's Modulus of the first fibers is higher than a Young's Modulus of the second fibers.

12. The method of claim 7, wherein the outer section forms a pressure side, suction side, leading edge and trailing edge of the airfoil.

13. The airfoil of claim 7, further comprising:

forming at least one additional section comprising at least a third ceramic matrix composite, the at least one additional section comprising at least third fibers configured to preferentially reinforce the span, wherein a Young's Modulus of the at least third fibers along the span is lower than the Young's Modulus of the first fibers along the span and higher than the Young's modulus of the second fibers along the span; and joining the at least one additional section between the core and the outer section.

* * * * *